Jan. 16, 1923.
L. C. SCHNEIDER.
TRAP.
FILED FEB. 1, 1921.
1,442,449
2 SHEETS-SHEET 1
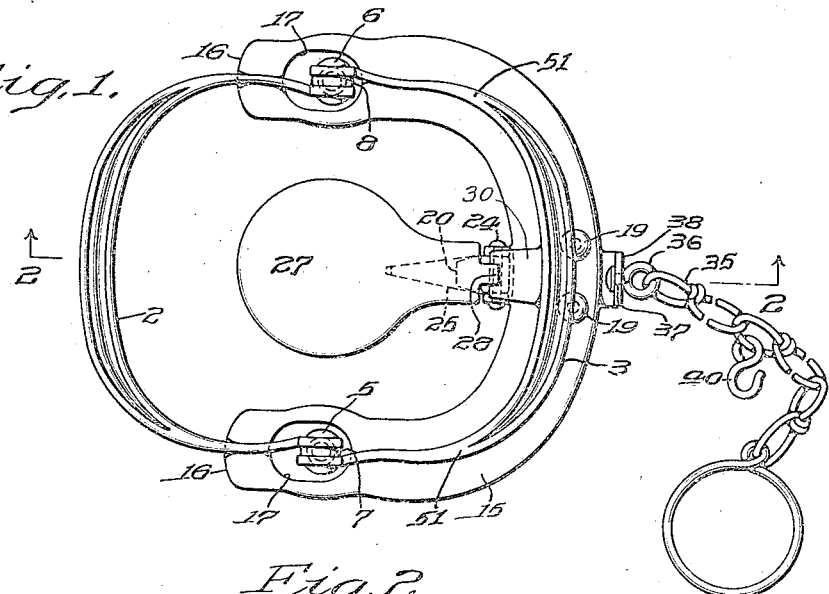
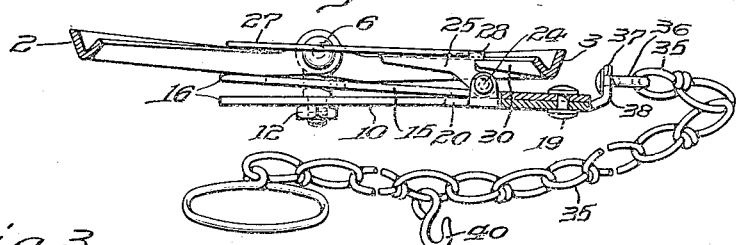
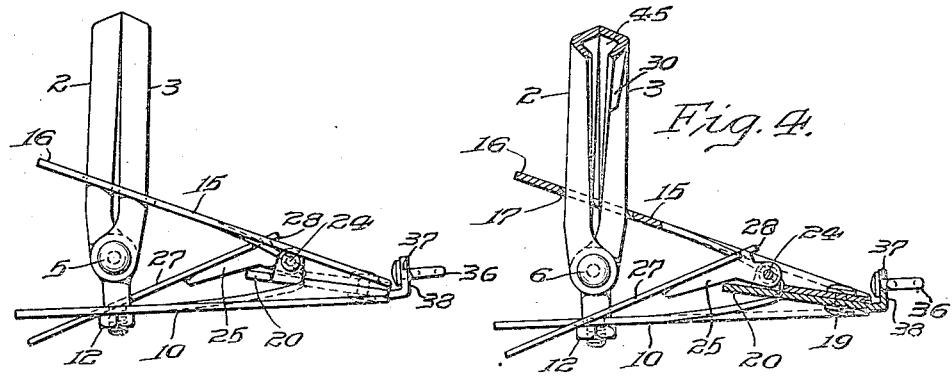
WITNESS
F. J. Hartman
INVENTOR
Leopold C. Schneider.
BY
ATTORNEYS Jan. 16, 1923.
L. C. SCHNEIDER.
TRAP.
FILED FEB. 1, 1921.
1,442,449
2 SHEETS-SHEET 2
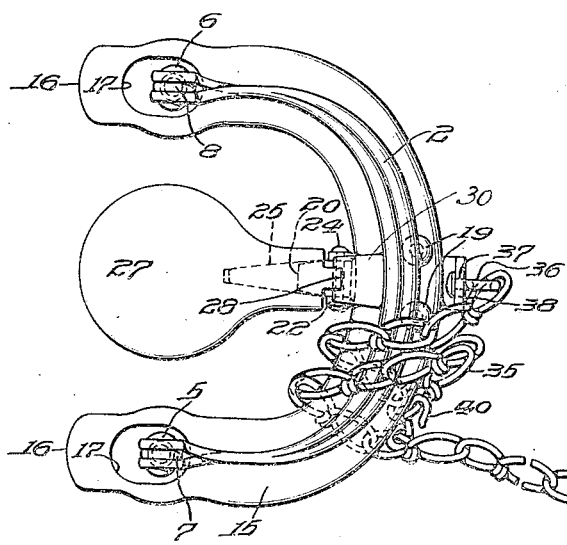
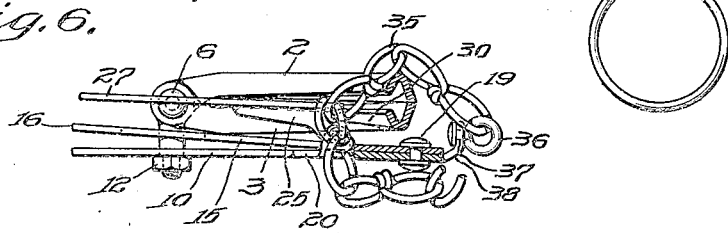
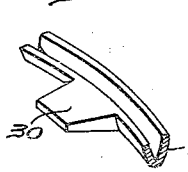
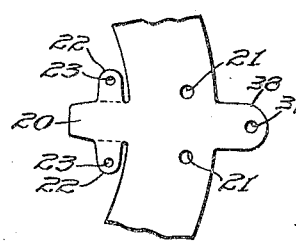
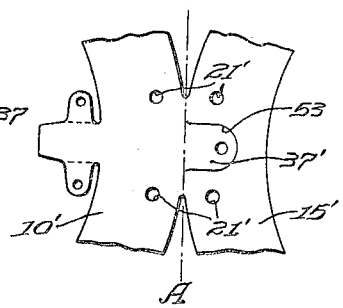
INVENTOR
Leopold C. Schneider.
BY
ATTORNEYS
WITNESS Patented Jan. 16, 1923.

1,442,449

UNITED STATES PATENT OFFICE.

LEOPOLD C. SCHNEIDER, OF GLENSIDE, PENNSYLVANIA.

TRAP.

Application filed February 1, 1921. Serial No. 441,546.

*To all whom it may concern:*

Be it known that I, LEOPOLD C. SCHNEIDER, a citizen of the United States, and a resident of Glenside, county of Montgomery, and State of Pennsylvania, have invented certain new and useful Improvements in Traps, of which the following is a specification, reference being had to the accompanying drawings.

Among the principal objects of my invention is to provide an animal trap of compact form and simple construction and employing a double spring, that is, a spring simultaneously cooperative with both sides of the jaws, which may be manufactured in all the usual commercial sizes, as hitherto the employment of a double spring in animal traps has been restricted to the larger sizes, it having been found impracticable to utilize such springs in the smaller size of traps. Further objects of my invention are to provide an animal trap in which the means operative to hold the jaw of the trap open or in set position is greatly simplified over the means hitherto employed for that purpose and in which the dog carried by and movable with the pan or pedal is directly cooperative with suitable means carried by one of the jaws, thereby entirely eliminating the use of the usual trigger.

Still further objects of my invention are to provide a trap of the character aforesaid in which both jaws are mounted on the same pivot and revolve upon the same axis thereby permitting the jaws to be folded over and secured in a convenient position for the transportation of the trap as hereinafter more fully explained.

My invention further contemplates the arrangement of the pan or pedal of the trap in a relatively low position with respect to the plane of the jaws when the trap is set; simplification of the cross arm and arrangement of the same and adjacent parts so as to minimize the possibility of the trap becoming inoperative through freezing or the accumulation of snow or foreign matter in the vicinity of the cross arm, and further contemplates the utilization of a preferred form of jaw whereby the chance of escape of an animal from the trap once it has been caught therein is substantially eliminated.

My invention further includes all of the other various objects and novel features of construction and arrangement hereinafter more definitely specified and described.

In the accompanying drawings I have illustrated certain embodiments of my invention, Fig. 1 being a plan view of a preferred form of trap in set position and Fig. 2 a vertical section, partially in elevation, substantially on the line 2—2 in Fig. 1. Fig. 3 is a view in side elevation of the trap in sprung position and Fig. 4 a similar view in partial vertical section, several of the parts being shown in elevation. Fig. 5 is a top plan view of the trap with both jaws folded down into a convenient position for carrying, the trap chain being wrapped about the jaws and spring in order to hold the former in place, and Fig. 6 is a vertical sectional view thereof with certain parts shown in elevation. Fig. 7 is a fragmentary perspective view of a portion of one of the jaws; Fig. 8 a fragmentary top plan view of the development of a portion of the spring base, and Fig. 9 a view similar to Fig. 8 but showing a slightly modified form of construction. Like numerals are employed to designate corresponding parts in the several figures.

As shown in the drawings, the trap comprises a pair of complementary oppositely disposed jaws 2, 3, the former being conveniently referred to as the free jaw. The jaws are of any suitable form but are preferably substantially semi-circular or crescent shaped, the ends of one of the jaws, as for example the free jaw, being inwardly offset, and the ends of the other jaw outwardly offset and the several ends provided with suitable apertures for the passage of horizontally disposed pivots 5, 6, which also extend through suitable apertures formed in the enlarged and preferably transversely flattened upper ends of the vertically extending jaw supports 7 and 8, the pivots being headed over or otherwise prevented from longitudinal displacement. It will be evident that the offsetting of the jaws adjacent the pivots is effective to permit the main portions of the jaws to rest in alignment with each other when the jaws are closed as in Figs. 3 and 4, while permitting the free jaw to be folded over on top of the other jaw into the position shown in Figs. 5 and 6 when desired.

The pivot supports 7 and 8 are respectively carried adjacent the outer extremities of the spring base 10 which is formed of spring steel or other tempered sheet metal ordinarily by a stamping or similar operation, and preferably generally follows in planary outline the configuration of the jaws, although of considerably greater transverse width at any given point than the jaw at a corresponding point. The pivot supports are rigidly operatively secured to the spring base in any suitable way, conveniently by forming the supports of reduced diameter for a portion of their length so as to form a shoulder on each support which can be drawn down on the upper surface of the spring base, which is provided with a suitable aperture for the passage of the support, by means of a nut 12 threaded onto the lower end of the support which extends through the spring base. Such an arrangement permits convenient removal of the supports from the spring base, but any other suitable means for positioning the supports upon the spring base may be employed if desired.

Superimposed on the spring base, and in certain constructions formed integral therewith and in others suitably secured thereto, is the spring 15 which is preferably substantially similar in planary outline to the spring base and provided adjacent its free extremities 16 with preferably slightly elongated apertures 17 through which the jaws extend, these apertures being of a length to engage the outer sides or edges of the jaws when the trap is sprung to hold the latter in closed position as best shown in Fig. 4, and of sufficient width to readily pass over the extremities of the pivots 5 and 6 during the operation of setting the trap as well as during the closing movement of the jaws. The extensions 16 of the spring form convenient points for gripping the spring when compressing the same in the operation of setting the trap.

In the form of the invention shown in Figs. 1 to 8 inclusive the spring 15 is formed separately from the spring base 10 and secured thereto adjacent its center, that is, substantially equidistant from its ends, in any suitable manner as by the rivets 19 passing through suitable apertures 21 formed in the spring base and corresponding apertures in the spring, the planary outlines of the jaws, the spring, and the spring base being preferably, as already stated, substantially similar, so that when the jaw 3 is turned down adjacent the upper surface of the spring when the trap is set these several parts will have a generally similar contour as clearly shown in Figs. 1 to 5, this similarity however being unnecessary for the successful operation of the trap, so that if desired in certain constructions these several parts may be made of different contours.

The spring base 10 is preferably flared or bent slightly outwardly and downwardly in opposite directions from the point adjacent the rivets 19, that is, from the center, and the spring 15 is substantially correspondingly bent or flared upwardly and outwardly from a corresponding point as most clearly shown in Fig. 3, the parts being so formed and secured together that the spring when in the position shown in said figure will be substantially relieved from tension and that when it is forced or compressed downwardly to substantially the position shown in Fig. 2, as when the trap is set, will be under maximum compression and in a position to force the jaws strongly together when it is released and springs upwardly.

Means are provided for holding the jaw 3 in substantially parallel relation with the spring base and spring when the trap is set, said means comprising a dog pivotally supported on a suitable cross arm and a lug carried by the jaw 3 and co-operative with the dog, the position of the latter being controlled by the position of the pan or pedal on which the animal steps to spring the trap. More particularly the cross arm preferably comprises an inwardly directed base 20 conveniently formed integrally with the spring base when the latter is stamped out and which carries a pair of oppositely laterally directed ears 22 which are turned up at right angles to the plane of the base 20 and provided with apertures 23 for the passage of a pivot pin 24 on which an arm 25 is rotatably carried. This arm is riveted or otherwise suitably secured to the pan 27 which is positioned within the area bounded by the jaws when open and between and spaced from the pivot supports 5 and 6. The arm 25 is provided with an overhanging dog 28 beneath which is adapted to engage the free end of a lug 30 carried by the jaw 3 and either formed integrally therewith or separately therefrom and suitably secured thereto, the co-acting faces of the dog and the lug being so formed that when the jaw is depressed to a position substantially parallel to the spring base, the dog may be slipped over the edge of the lug to retain the jaw in such position against the resistance of the spring 15 until a pressure is applied to the pan sufficient to move the arm slightly about the pivot 24 and release the dog from engagement with the lug. It will of course be understood that the several parts just described are so proportioned and adjusted that a relatively slight pressure on the pan is sufficient to release the dog and permit the jaw 3 to move upwardly under the influence of the spring, the free jaw which, when the trap is set, is manually depressed to a position substantially parallel with the jaw 3 also simultaneously moving upwardly under the action of the spring.

For the purpose of securing the trap to a log, stake or the like I may provide the same with a chain 35 and attach one end of the same to the trap by means of a swivel 36 which extends through an aperture 37 formed in a lug 38 preferably integral with and extending outwardly from the spring base, the outer end of the lug being turned up substantially at right angles thereto. I prefer to form this lug during the operation of stamping out the spring base in the manner shown in Fig. 8.

A particular advantage presented by a trap formed as herein described resides in the fact that after the jaw 3 has been depressed into set position and the dog 28 engaged with the lug 30, the free jaw 2 may be folded over against the jaw 3 and both jaws secured in this position by winding the chain about them, the spring and the spring base as indicated in Fig. 5, in which the chain is shown as having been carried twice around the parts. To hold the chain in its wrapped position I preferably attach at a suitable point in the same a hook or catch 40 adapted to hook into the wrapped portion of the chain and prevent it from slipping out of its wrapped position. The trap may thus be reduced to very compact form for transportation or shipment, while in the case of large traps the springs of which are so powerful as to require some means other than manual for their compression in setting the trap, the latter may be set at some convenient point, the chain wrapped about the jaws and the trap transported in set condition to the place where it is to be used thereby avoiding the necessity of carrying the mechanical spring compressor to such point. Just before placing the trap in position the chain is unwound, the free jaw turned back to the position shown in Fig. 2 and the trap is then ready for use.

While the particular form and construction of the jaws may be varied to suit conditions found in practice or the peculiarities of the particular animal for the capture of which the trap is designed, I prefer, under ordinary conditions and in order to secure a maximum holding power and prevent the escape of an animal caught in the trap by pulling its foot from between the jaws after gnawing off that portion of the foot projecting below them, to utilize jaws of substantially the form shown in the drawings. The major portion of each of such jaws, that is, the portion extending above the offsets, is of substantially V-shaped transverse section with the open end of the V directed toward the opposite jaw, the lower wall of the V being slightly shorter than the upper, so that when both jaws are closed and in the position shown in Fig. 4, their upper edges will contact and their lower edges be spaced slightly apart leaving a substantially diamond shaped opening 45 in the interior of the jaws. It will be understood that this cavity is of greater size adjacent the center of the jaws and gradually diminishes toward their extremities so that at some point 51 more or less adjacent the offset portions of the jaws the cavity disappears entirely. When the leg or foot of an animal is caught between a pair of jaws of this character, the flesh rapidly swells within the cavity and thereby prevents the animal from withdrawing his foot from the jaws even though he should gnaw off that portion thereof projecting below them.

While I have hitherto referred more particularly to a form of the invention in which the springs and spring base are formed separately and secured together by rivets or otherwise, in Fig. 9 I have shown a slightly modified construction in which both of these parts are stamped out unitarily from a single sheet of metal, the spring base 10' and spring 15' in the flat blank thus formed being joined along the line A—A and extending outwardly in opposite directions therefrom. After the blank has been formed in this manner, the spring is bent over along the line A—A to the desired superposed position above the spring base and if desired, for the purpose of holding the parts more securely in position, rivets may be inserted through the apertures 21' formed in the spring and in the spring base and which are arranged to coincide when the former is turned over on the latter. During the stamping operation or at any other suitable time a suitably shaped cut 53 may be made in the blank so as to define a lug 37' which, after the spring is turned over on the spring blank, may be turned up into vertical position for the attachment of the chain swivel 36.

It will be evident that a further advantage of my improved trap arises from the elimination of the usual loose trigger which in traps as ordinarily constructed is arranged to extend over the upper face of the jaw to engage the dog when the trap is set, and consequently must be thrown forcibly upwardly and rearwardly as the subjacent jaw starts to rise when the trap is sprung; a condition which frequently results in the trigger throwing the animal's foot upwardly out of reach of the jaws, especially when the animal steps on the pan from the direction of the trigger. In my improved trap, however, since there is no part whatsoever overlying the open jaws, their prompt and rapid closure is never impeded and no matter how, or from what direction, the animal steps on the pan, the operation of the trap is the same and the liability of the foot being thrown out when the trap is sprung is entirely obviated.

While I have herein described with considerable particularity certain embodiments of my invention, I do not thereby desire or intend to limit myself to any precise details of construction and arrangement of parts as suitable changes and modifications may be made therein, and the particular form of jaw employed may be varied as desired or a plain jaw substituted for the preferred form which I have illustrated, without departing from the spirit and scope of the invention as defined in the appended claims.

Having thus described my invention, I claim and desire to protect by Letters Patent of the United States:

1. An animal trap comprising a pair of complementary jaws, a spring base in planary outline substantially similar to the general contour of each of said jaws and bent downwardly from its center toward its free ends, means for supporting said jaws for vertical movement on said base, a spring of shape substantially similar to said base fixed thereto adjacent its center and bent upwardly therefrom toward its free ends, the free ends of said spring being cooperative with the sides of said jaws, and means for holding one of said jaws in substantially parallel relation with said base and against the compression of said spring.

2. An animal trap comprising a pair of complementary jaws, a spring base in planary outline substantially similar to the shape of each of said jaws, a spring of shape substantially similar to said base, superposed thereon and secured thereto adjacent its center, the free ends of said spring being provided with apertures for the passage of said jaws, means for pivotally supporting said jaws adjacent the ends of said base for vertical movement with respect thereto, and releasable means operative to hold one of said jaws in substantially parallel relation to said base against the compression of said spring.

3. An animal trap having a pair of complementary jaws, an end of one of said jaws being inwardly offset and an end of the other jaw being outwardly offset, a spring base having the general shape of each of said jaws, means for supporting said jaws on said base for pivotal movement with respect thereto, said means comprising a single pivot for the adjacent ends of both of said jaws, a spring superimposed on said base, fixed thereto at its center and having free ends cooperative with said jaws, the free ends of the spring and of the base being respectively bent in opposite directions; means for holding one of said jaws in fixed position against the compression of said spring and a chain attached to said base, the other jaw being adapted to be folded down on said first mentioned jaw when said latter is held by said means and retained in such position by wrapping said chain around the jaws and said spring and base adjacent the center thereof.

4. An animal trap comprising a spring base having free spaced downwardly directed ends, a pivot support adjacent each of said ends, a pivot extending through said support, a pair of complementary jaws having their ends respectively offset to permit said ends to be disposed on opposite sides to said pivot supports and upon said pivots, a spring superposed on said base, fixed thereto at its center and having free upwardly directed ends cooperative with the opposite sides of both of said jaws, and means operative to hold one of said jaws in substantially parallel relation to said spring base and against the compression of said spring, the other jaw adapted to be turned down on said first mentioned jaw when said latter is restrained from movement by said means.

5. An animal trap comprising a pair of complementary jaws, a spring base having the general contour of each of said jaws and having downwardly flared ends, means for pivotally supporting the ends of said jaws adjacent the ends of said base, a spring having the general shape of said base, superposed thereon, secured thereto at its center and having upwardly flared spaced free ends extending upwardly in angular relation with said base when said spring is relieved from compression, each of said ends having an aperture for the passage of said jaws, and means for releasably holding one of said jaws in substantially parallel relation with said base and against the compression of said spring, said means comprising a lug carried by said jaw and a movable dog cooperative therewith, the opposite jaw being adapted when said first mentioned jaw is held by said means to be manually turned down against said jaw or to be turned in the opposite direction away from said jaw into a position substantially parallel thereto.

In witness whereof, I have hereunto set my hand this 27th day of January A. D. 1921.

LEOPOLD C. SCHNEIDER.